United States Patent
Yeung et al.

(10) Patent No.: US 10,479,953 B2
(45) Date of Patent: Nov. 19, 2019

(54) EMULSIFIER FOR USE IN LUBRICATING OIL

(71) Applicant: Afton Chemical Corporation, Richmond, VA (US)

(72) Inventors: Andrew Yeung, Henrico, VA (US); Anthony Jarvis, Bebington (GB); Matthew Ross, Audenshaw (GB)

(73) Assignee: AFTON CHEMICAL CORPORATION, Richmond, VA (US)

( * ) Notice: Subject to any disclaimer, the term of this patent is extended or adjusted under 35 U.S.C. 154(b) by 149 days.

(21) Appl. No.: 15/869,589

(22) Filed: Jan. 12, 2018

(65) Prior Publication Data

US 2019/0218472 A1 Jul. 18, 2019

(51) Int. Cl.
*C10M 145/22* (2006.01)
*C08G 63/676* (2006.01)

(52) U.S. Cl.
CPC ......... *C10M 145/22* (2013.01); *C08G 63/676* (2013.01); *C10M 2209/102* (2013.01); *C10N 2250/02* (2013.01)

(58) Field of Classification Search
CPC .............. C10M 145/22; C10M 145/38; C10M 2207/34; C10M 2209/109; C10M 2209/102; C08G 81/027; C08G 63/672; C08G 63/676; C10N 2220/021; C10N 2230/24; C10N 2230/78; C10N 2240/10; C10N 2240/40; C10N 2250/022; C10N 2250/02
See application file for complete search history.

(56) References Cited

U.S. PATENT DOCUMENTS

| 3,294,711 | A | * | 12/1966 | Von Bonin | C08F 283/02 521/137 |
|---|---|---|---|---|---|
| 3,381,022 | A | | 4/1968 | Le Suer | |
| 4,072,618 | A | | 2/1978 | Andress, Jr. | |
| 9,228,152 | B2 | * | 1/2016 | Thompson | C10M 145/16 |
| 2015/0344813 | A1 | | 12/2015 | Strong et al. | |
| 2019/0078009 | A1 | * | 3/2019 | Mettath | C09K 8/24 |

FOREIGN PATENT DOCUMENTS

| EP | 2952561 A1 | 12/2015 |
|---|---|---|
| EP | 2952562 A1 | 12/2015 |
| EP | 2952563 A1 | 12/2015 |
| EP | 2977436 A1 | 1/2016 |
| GB | 2117398 A | 10/1983 |
| WO | 2008074983 A1 | 6/2008 |
| WO | WO2011/107739 A1 | 9/2011 |

OTHER PUBLICATIONS

Extended Search Report in EP Application No. 19150436.4, dated Jun. 4, 2019, pp. 1-7.

* cited by examiner

*Primary Examiner* — Cephia D Toomer
(74) *Attorney, Agent, or Firm* — Honigman LLP

(57) ABSTRACT

The present disclosure relates to emulsifying agents produced from succinic acids or anhydrides and polyalkylene glycols. The present disclosure also relates to lubricating oils containing such emulsifying agents. The emulsifying agent provides a lubricating oil that is substantially free of an aqueous layer after about 24 hours when tested according to ASTM D7563-10.

10 Claims, No Drawings

EMULSIFIER FOR USE IN LUBRICATING OIL

TECHNICAL FIELD

The present disclosure relates to polymer compounds produced from the reaction of a succinic acid or anhydride and a polyalkylene glycol suitable for use as emulsifying agents in lubricating oil. The present disclosure also relates to lubricating oils containing such emulsifying agents.

BACKGROUND

E85 is an ethanol fuel blend of 85% denatured ethanol fuel and 15% gasoline or other hydrocarbon by volume. Unfortunately, ethanol is hygroscopic, and as such, bio-fuels like E85 have a greater tendency to succumb to water contamination during engine operation. This water contamination of the fuel can, in some instances, negatively affect the lubrication and detergency of engine oil by introducing free water into the engine compartment. The reduced lubricity and detergency of the engine oil due to the presence of free water in the engine compartment can, in some circumstances, result in premature engine wear. To date, it has been difficult to hinder water from entering into the E85 gasoline during the stages of transport, storage in gas station tanks, and storage in automobile tanks. Accordingly, engine oil formulations often include additives or components to emulsify water in the oil so as to counteract the shortcomings of the water and/or fuel contamination, and therefore usually include an emulsifying agent in the lubricant to do this job.

The emulsifying agent generally should be effective at the emulsification of free water in the oil and remain soluble in the oil over a wide temperature range. Prior emulsifying agents can suffer flocculation and drop out of the oil in some instances and, thus, the effectiveness as an emulsification agent is greatly reduced in these circumstances. Other prior emulsifying agents involve complex chemistries and build multiple components into an emulsifying polymer that tends to drive up manufacturing and component costs with little gain in effectiveness. Other prior emulsifying agents require relatively higher treat rates to achieve desired levels of emulsification, which also drives up costs and formulation complexities.

The effectiveness of the emulsifying agent can be determined using standard tests, such as ASTM D7563-10, the so-called E85 emulsion test. This test evaluates the ability of an engine oil, contaminated with a specified amount of water and simulated E85 fuel, to emulsify the water after agitation, to maintain this emulsion, and to remain substantially free of an aqueous layer at temperatures of 20° C. to 25° C. and −5° C. to 0° C. for at least 24 h. A challenge remains to devise a simple emulsifying agent that can be used in relative low amounts to achieve a stable emulsion over wide temperature ranges.

SUMMARY

In one aspect, the present disclosure includes an emulsifying agent for lubricating oil compositions. In one approach, the emulsifying agent includes a compound of Formula I

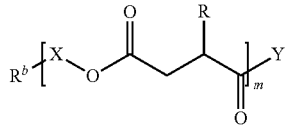

Formula I wherein each X is independently a polyalkylene oxide group of the formula $—[OA]_p—$; Y is a hydroxyl group or a polyalkylene oxide group of the formula $—[OA]_p—OH$; each A is independently an alkylene selected from the group consisting of ethylene, propylene, and butylene, and mixtures thereof; and $R^b$ is H or a chemical moiety having the structure

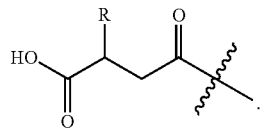

In Formula I, R is a linear or branched aliphatic group having a number average molecular weight of about 750 to about 2500; p is an integer to independently provide each X and/or each Y with a number average molecular weight of about 100 to about 1000; and m is an integer to provide the compound of Formula I with a weight average molecular weight of from about 7,000 to about 50,000.

The emulsifying agent of the preceding paragraph can be combined with a number of optional features, either individually or in combinations thereof. For example, in some embodiments, p is an integer which provides a polyalkylene oxide group with a number average molecular weight from about 150 to about 200; and/or the compound of Formula I has weight average molecular weight of about 10,000 to about 15,000; and/or R has a number average molecular weight of about 950 to about 2300, for example, about 950 to about 1200; and/or the compound of Formula I is produced from a catalyzed reaction consisting essentially of a polyalkylene glycol reacted with a dicarboxylic acid or anhydride of a dicarboxylic acid; and/or the catalyzed reaction includes a polyisobutylene succinic anhydride; and/or the polyisobutylene group thereof has a number average molecular weight of about 950 to about 2300, for example, about 950 to about 1200; and/or the molar ratio of the polyalkylene glycol to the dicarboxylic acid or anhydride in the catalyzed reaction is about 0.1:1.0 to about 1.0:0.1; and/or when the emulsifying agent is present in a lubricating oil in a weight percent of about 0.001 to about 5.0 percent, preferably about 0.01 to about 1.0 percent, said lubricating oil is substantially free of an aqueous layer after about 24 hours when tested according to ASTM D7563-10; and/or each A is independently an ethylene or propylene; and/or the number average molecular weight of the linear or branched R group is about 1.5 to about 15, preferably about 2 to about 10, or in another approach, about 2 to about 5, times higher than the number average molecular weight of the polyalkylene oxide group.

In another aspect, the disclosure includes a lubricating oil composition comprising a major amount of a base oil and an emulsifying agent including a compound of Formula I

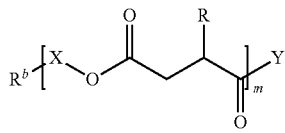

Formula I wherein each X is independently a polyalkylene oxide group of the formula —[OA]$_p$-; Y is a hydroxyl group or a polyalkylene oxide group of the formula —[OA]$_p$-OH; each A is independently an alkylene selected from the group consisting of ethylene, propylene, and butylene, and mixtures thereof; and R$^b$ is H or a chemical moiety having the structure

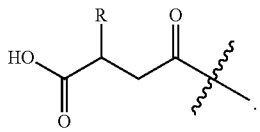

In Formula I, R is a linear or branched aliphatic group having a number average molecular weight of about 750 to about 2500; and p is an integer to independently provide each X and/or each Y with a number average molecular weight of about 150 to about 1000; and m is an integer to provide a number average molecular weight of the compound of Formula I from about 7,000 to about 50,000.

The lubricating oil composition of the preceding paragraph can be combined with a number of optional features, either individually or in combinations thereof. For example, in some embodiments of this aspect, p is an integer which provides a polyalkylene oxide group with a number average molecular weight from about 150 to about 200; and/or the compound of Formula I has a number average molecular weight of about 10,000 to about 15,000; and/or R has a number average molecular weight of about 950 to about 2300, for example, about 950 to about 1200; and/or the lubricating oil composition includes about 0.001 to about 2.0 percent, preferably about 0.01 to about 0.2 weight percent of the compound of Formula I; and/or the emulsifying agent of Formula I is produced from a catalyzed reaction consisting essentially of a polyalkylene glycol reacted with a dicarboxylic acid or anhydride of a dicarboxylic acid; and/or the catalyzed reaction includes a polyisobutylene succinic anhydride; and/or wherein the polyisobutylene group thereof has a number average molecular weight of about 750 to about 2500; and/or the molar ratio of the polyalkylene glycol to the dicarboxylic acid or dicarboxylic anhydride in the catalyzed reaction is about 0.1:1.0 to about 1.0:0.1; and/or the lubricating oil composition is substantially free of an aqueous layer after about 24 hours when tested according to ASTM D7563-10; and/or the number average molecular weight of the linear or branched R group is about 1.5 to about 15, preferably about 2 to about 10 times, or in another approach, about 2 to about 5 times higher than the number average molecular weight of the polyalkylene oxide group.

DETAILED DESCRIPTION

Described herein are novel emulsifying agents for lubricating oils that achieve stable emulsions over a wide temperature range. The emulsifying agents are suitable for both engine oils and other lubricating oils, such as those for metalworking and the like.

Engine or crankcase lubricant compositions are used in vehicles containing spark ignition and compression ignition engines to provide friction reduction and other benefits. Such engines may be used in automotive, truck, and/or train applications and may be operated on fuels including, but not limited to, gasoline, diesel, alcohol, bio-fuels, compressed natural gas, and the like. This disclosure describes emulsifying agents and lubricants including such agents suitable for use as engine lubricants, such as automotive crankcase lubricants that, in some instances, may meet or exceed the ILSAC GF-5 and/or API CJ-4 lubricant standards. Other lubricants, such as those used in industrial or personal machines for metal working, may also benefit from the emulsifying agents of this disclosure.

As noted above, bio-fuels such as E10 to E85 or higher bio fuels tend to succumb to water contamination that can ultimately affect engine oil performance. Water from the fuel can contaminate the oil and water-contaminated oil can reduce the effectiveness of the lubricating and detergency properties of the lubricating oil. Water contaminations may, in some instances, also lead to a change in the viscosity of the lubricant, causing it to thicken or thin, and in some cases effect equipment reliability.

An emulsifier, also called an emulsifying agent or emulsifying compound, is a substance that stabilizes an emulsion by increasing its kinetic stability. Emulsifiers are a common additive to most types of lubricating oils. In some instances, however, prior emulsifying agents tend to flocculate or separate from the oil as precipitates or insoluble globules. This phenomenon, often known as emulsifier drop-out can be a common problem with prior emulsifiers and can leave the engine or mechanical device vulnerable to corrosion or damage from ineffective lubricating oil.

Herein are described emulsifier compounds that stabilize emulsions in lubricating oils at surprisingly low treat rates and provide low drop-out rates at the same time. The emulsifier compounds are the reaction product of succinic acids or anhydrides and polyalkylene glycols and, in some approaches, the reaction product consisting essentially of or only succinic acids or anhydrides and polyalkylene glycols without having other reactants or monomers built into the emulsifier. It was discovered that the emulsifying compounds herein can achieve stable emulsions as tested by the E85 emulsification test at lower treat rates than prior agents.

In one aspect, the emulsifier compounds herein include polymers of di or poly carboxylic acids and polyalkylene monomer units as discussed more fully below. These emulsifier compounds can be added to a lubricating oil, wherein the lubricating oil has application in engines, metal working, and other applications needing oil lubrication. The treat rates for the emulsifier compounds herein in the lubricating oil are those effective to result in the lubricating oil being substantially free of an aqueous layer after about 24 hours when tested according to ASTM D7563-10 (the E-85 Emulsion Test). A surprising advantage of the emulsifying compounds herein are the relatively low treat rates needed to form a lubricating oil that passes the ASTM D7563-10 test. In some approaches, the emulsifying compound is present in a lubricating oil in a weight percent of about 0.001 to about 2 weight percent and, in other approaches, about 0.01 to about 1.0 percent. In yet other approaches, a treat rate may be about 0.001 to about 5 weight percent depending on the application. In still other approaches, the emulsifying compound is present in a lubricating oil in a weight percent of about 0.01 to about 0.75 percent. In another approach, the emulsifying agent is present in a lubricating oil in a weight percent of about 0.01 to about 0.50 percent. In still another approach, the emulsifying agent is present in a lubricating oil in a weight percent of about 0.01 to about 0.2 percent, and in further approaches, about 0.01 to about 0.05 percent, about 0.05 to about 0.1 percent, about 0.1 to about 0.15 percent, about 0.15 to about 0.20 percent, or about 0.20 to about 0.25 percent. In yet other approaches, the emulsifying compounds is provided in lubricating oils in amounts of about 0.01 to less than about 0.2 weight percent.

Turning to more of the specifics, the emulsifier compounds herein are and/or include polymers of Formula I

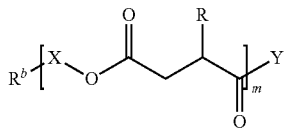

(Formula I)

wherein each X is independently a polyalkylene oxide group of the formula —[OA]$_p$- and each A thereof is independently an alkylene selected from the group consisting of ethylene, propylene, butylene, and mixtures thereof. In some approaches, each of the alkylene oxides may be independently and optionally substituted with one or more instances of $C_1$-$C_6$ alkyl, $C_3$-$C_6$ cycloalkyl, 3-6 membered heterocycloalkyl, phenyl, or 3-6 membered heteroaryl, wherein the alkyl, cycloalkyl, phenyl, heterocycloalkyl, and heteroaryl are each independently and optionally substituted with one or more of halo, oxo, cyano, nitro, amino, amido, —OH, —COOH, or —COO($C_1$-$C_4$ alkyl). In Formula I, Y is a hydroxyl group or a polyalkylene oxide group of the formula —[OA]$_p$-OH; each A is independently an alkylene selected from the group consisting of ethylene, propylene, and butylene, and mixtures thereof (optionally substituted as discussed above); $R^b$ is H or a chemical moiety having the structure

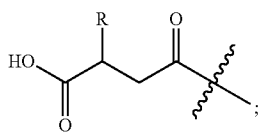

R is a linear or branched aliphatic group having a number average molecular weight of about 750 to about 2500, p is an integer to independently provide each X and/or each Y (the polyalkylene oxide group(s)) with a number average molecular weight of about 150 to about 1000; and m is an integer to provide the compound of Formula I with a weight average molecular weight from about 7,000 to about 50,000 (in other approaches, about 10,000 to about 50,000).

The polymer of Formula I may be made from the reaction of an aliphatic polymer compound having a terminal succinic acid (Formula II) or succinic anhydride (Formula III) with a polyalkylene glycol (see Scheme 1 described more fully below).

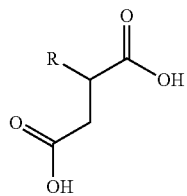

(Formula II)

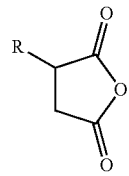

(Formula III)

In Formula II and III, R is the aliphatic polymer. The aliphatic polymer providing the R group can be of any reasonable length, however preferably of a number average molecular weight that is above 750 g/mol. With R groups having a molecular weight below 750 g/mol, the chain has insufficient length to act as an effective emulsifier. In some embodiments, the aliphatic polymer R can have a number average molecular weight from about 750 to about 10,000 g/mol. In some other embodiments, the aliphatic polymer R can have a number average molecular weight from about 750 to about 5000 g/mol. In a further embodiment, the aliphatic polymer has a number average molecular weight from about 750 to about 3000 g/mol. In a further embodiment, the aliphatic polymer has a number average molecular weight from about 750 to about 2500 g/mol, for example, the aliphatic polymer can have a number average molecular weight from about 750 to about 1200 g/mol, from about 800 to about 1200 g/mol, from about 900 to about 1100 g/mol, from about 950 to about 1050 g/mol, from about 2000 to about 2500 g/mol, from about 2100 to about 2400 g/mol, from about 2200 to about 2400 g/mol, or from about 2250 to about 2350 g/mol. In a further embodiment, the aliphatic polymer has a number average molecular weight of about 950 g/mol. In another further embodiment, the aliphatic polymer has a number average molecular weight of about 2300 g/mol, and in yet other approaches, about 1000 g/mol.

The aliphatic polymer R can be made from linear or branched aliphatic monomers having 2-10 carbon atoms. In a further embodiment, the aliphatic polymer can made from linear or branched aliphatic monomers having 2-6 carbon atoms. In other embodiments, the aliphatic polymer is made from monomers selected from propyl, isopropyl, n-butyl, isobutyl, n-pentyl, isopenyl, neopentyl, n-hexane, 2-methylpentane, 3-methylpentane, 2,2-dimethylbutane, and 2,3-dimethylbutane monomers, or mixtures thereof. In one preferred embodiment, the aliphatic polymer is made from isobutyl monomers. In one embodiment, the carboxylic starting material is polyisobutylene succinic acid or polyisobutylene succinic anhydride.

In some embodiments, the polyalkylene glycol has a number average molecular weight of over 100 g/mol. In a further embodiment, the polyalkylene glycol has a number average molecular weight of from about 100 to about 1500 g/mol. In still a further embodiment, the polyalkylene glycol has a number average molecular weight of from about 100 to about 800 g/mol. In another further embodiment, the polyalkylene glycol has a number average molecular weight of from about 100 to about 400 g/mol. In still another further embodiment, the polyalkylene glycol has a number average molecular weight of from about 150 to about 250 g/mol. In another embodiment, the polyalkylene glycol has a number average molecular weight of about 200 g/mol. In yet other approaches, the polyalkylene glycol has a number average molecular weight below 200 g/mol.

In one embodiment, the polyalkylene glycol (of the X or Y groups) is made from a monomer comprising a polyalkylene oxide group of the formula —[OA]$_p$-. Each A of this group is independently an alkylene selected from the group consisting of ethylene, propylene, butylene, or mixtures thereof. Optionally, each A may also be independently substituted with one or more instances of $C_1$-$C_6$ alkyl, $C_3$-$C_6$ cycloalkyl, 3-6 membered heterocycloalkyl, phenyl, or 3-6 membered heteroaryl, wherein the alkyl, cycloalkyl, phenyl, heterocycloalkyl, and heteroaryl are each independently and optionally substituted with one or more of halo, oxo, cyano, nitro, amino, amido, —OH, —COOH, or —COO($C_1$-$C_4$ alkyl). In the polyalkylene group formula above, p is an integer appropriate to provide a molecular weight as defined above. In still a further approach, each A is independently an ethylene. In one approach, p of the formula above in the polyalkylene glycol is an integer from 2 to 6. In a further embodiment, p is an integer from 3 to 5.

In one embodiment, the emulsifier compounds of Formula I can have a weight average molecular weight of about 7000 to about 50,000 g/mol. In another embodiment, the emulsifier compounds of Formula I can have a weight average molecular weight of about 7000 to about 30,000 g/mol. In a further embodiment, the emulsifier compounds of Formula I can have a weight average molecular weight of about 8000 to about 20,000 g/mol. In still a further embodiment, the emulsifier compounds of Formula I can have a weight average molecular weight of about 10,000 to about 15,000 g/mol, for example, about 10,000 g/mol, about 11,000 g/mol, about 12,000 g/mol, about 13,000 g/mol, about 14,000 g/mol, or about 15,000 g/mol and any ranges there between.

In one embodiment, m is an integer from 5 to 15. In another embodiment, m is an integer from 6 to 14. In another embodiment, m is an integer from 6 to 13. In another embodiment, m is an integer from 7 to 12.

In some approaches or embodiments, there is a select molar ratio of the number average molecular weight of the polyalkylene oxide group to the number average molecular weight of the linear or branched aliphatic group. For example and in some approaches, the number average molecular weight of the linear or branched aliphatic group (R) is about 1.5 to about 15 times higher than the number average molecular weight of the polyalkylene oxide group, in other approaches, the R group is about 2 to about 10 times higher, and in yet further approaches, the R group is about 2 to about 5 times higher than the number average molecular weight of the polyalkylene oxide group (—[OA]$_p$-). In some approaches, the emulsifying agent includes a polyalkylene oxide group having a number average molecular weight of 200 g/mol combined with a linear or branched aliphatic group having a number average molecular weight of 1000 g/mol and, thus, a molecular weight about 5 times higher than the polyalkylene oxide group. In other approaches, the emulsifier has a polyalkylene oxide group having a number average molecular weight of about 1000 g/mol, but in this instance, the linear or branched aliphatic group typically would then have a higher number average molecular weight of about 2300 g/mol and, thus, a molecular weight about 2.3 times higher than the polyalkylene oxide group.

Previously known emulsifier compounds generally include surfactant molecules, such as polyamines or polycarboxylic acids, and friction modifiers comprising three or more types of monomer units including polyols, mono and polycarboxylic acids, and polyamines all built into the same polymer at the same time. These prior emulsifiers are complex and costly to manufacture due to the monomer mixture and still, in some instances, can suffer from undesirable properties, such as higher treat rates to achieve emulsion stability, emulsifier drop-out, and synthetic complexity. Prior emulsifiers, due to their complex monomer make-up, are also highly branched. For example, prior emulsifiers use or contain a poly-alcohol or poly-acid with three or more functional OH or COOH groups that could result in a crosslinked polymer. The present disclosure, on the other hand, provides emulsifiers through a simple and high yielding one-step synthesis that enable surprisingly low treat rates to achieve stable emulsions and do not drop out of the oil as they stabilize emulsions in a relatively simple and compact compound relative to prior structures. In some approaches, the emulsifier compounds of the present disclosure are also linear polymers or straight chain polymers.

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

As described herein, compounds may optionally be substituted with one or more substituents, such as are illustrated generally above, or as exemplified by particular classes, subclasses, and species of the disclosure.

As used herein the term "aliphatic" encompasses the terms alkyl, alkenyl, alkynyl, each of which being optionally substituted as set forth below.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or heterocycloalkenyl], aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (heterocycloalkyl)carbonylamino, (heterocycloalkylalkyl) carbonylamino, heteroarylcarbonylamino, heteroaralkylcarbonylamino alkylaminocarbonyl, cycloalkylaminocarbonyl, heterocycloalkylaminocarbonyl, arylaminocarbonyl, or heteroarylaminocarbonyl], amino [e.g., aliphaticamino, cycloaliphaticamino, or heterocycloaliphaticamino], sulfonyl [e.g., aliphatic-$SO_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroarylalkoxy, alkoxycarbonyl, alkylcarbonyloxy, or hydroxy. Without limitation, some examples of substituted alkyls include carboxyalkyl (such as HOOC-alkyl, alkoxycarbonylalkyl, and alkylcarbonyloxyalkyl), cyanoalkyl, hydroxyalkyl, alkoxyalkyl, acylalkyl, aralkyl, (alkoxyaryl)alkyl, (sulfonylamino)alkyl (such as (alkyl-SO$_2$-amino)alkyl), aminoalkyl, amidoalkyl, (cycloaliphatic)alkyl, or haloalkyl.

As used herein, an "alkenyl" group refers to an aliphatic carbon group that contains 2-8 (e.g., 2-12, 2-6, or 2-4) carbon atoms and at least one double bond. Like an alkyl group, an alkenyl group can be straight or branched. Examples of an alkenyl group include, but are not limited to allyl, isoprenyl, 2-butenyl, and 2-hexenyl. An alkenyl group can be optionally substituted with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic) carbonyl, (cycloaliphatic) carbonyl, or (heterocycloaliphatic)carbonyl], nitro, cyano, amido [e.g., (cycloalkylalkyl)carbonylamino, arylcarbonylamino, aralkylcarbonylamino, (hetero cycloalkyl) carbonylamino, (heterocycloalkylalkyl)carbonylamino, heteroarylcarbonylamino, heteroaralkylcarbonylamino alkylaminocarbonyl, cycloalkylaminocarbonyl, hetero cyclo alkylaminocarbonyl, arylaminocarbonyl, or heteroarylaminocarbonyl], amino [e.g., aliphaticamino, cycloaliphaticamino, heterocycloaliphaticamino, or aliphaticsulfonylamino], sulfonyl [e.g., alkyl-SO$_2$—, cycloaliphatic-SO$_2$—, or aryl-SO$_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyalkenyl, aralkenyl, (alkoxyaryl) alkenyl, (sulfonylamino)alkenyl (such as (alkyl-SO$_2$-amino)alkenyl), aminoalkenyl, amidoalkenyl, (cycloaliphatic)alkenyl, or haloalkenyl.

As used herein, an "alkynyl" group refers to an aliphatic carbon group that contains 2-8 (e.g., 2-12, 2-6, or 2-4) carbon atoms and has at least one triple bond. An alkynyl group can be straight or branched. Examples of an alkynyl group include, but are not limited to, propargyl and butynyl. An alkynyl group can be optionally substituted with one or more substituents such as aroyl, heteroaroyl, alkoxy, cycloalkyloxy, heterocycloalkyloxy, aryloxy, heteroaryloxy, aralkyloxy, nitro, carboxy, cyano, halo, hydroxy, sulfo, mercapto, sulfanyl [e.g., aliphaticsulfanyl or cycloaliphaticsulfanyl], sulfinyl [e.g., aliphaticsulfinyl or cycloaliphaticsulfinyl], sulfonyl [e.g., aliphatic-SO$_2$—, aliphaticamino-SO$_2$—, or cycloaliphatic-SO$_2$—], amido [e.g., aminocarbonyl, alkylaminocarbonyl, alkylcarbonylamino, cyclo alkylaminocarbonyl, heterocycloalkylaminocarbonyl, cycloalkylcarbonylamino, arylamino carbonyl, arylcarbonylamino, aralkylcarbonylamino, (heterocycloalkyl) carbonylamino, (cycloalkylalkyl)carbonylamino, heteroaralkylcarbonylamino, heteroaryl carbonylamino or heteroarylaminocarbonyl], urea, thiourea, sulfamoyl, sulfamide, alkoxycarbonyl, alkyl carbonyloxy, cycloaliphatic, heterocycloaliphatic, aryl, heteroaryl, acyl [e.g., (cycloaliphatic) carbonyl or (heterocycloaliphatic)carbonyl], amino [e.g., aliphaticamino], sulfoxy, oxo, carboxy, carbamoyl, (cycloaliphatic)oxy, (heterocyclo aliphatic) oxy, or (heteroaryl)alkoxy. As used herein, an "amido" encompasses both "aminocarbonyl" and "carbonylamino". These terms when used alone or in connection with another group refer to an amido group such as —N(R$^X$)—C(O)—R$^Y$ or —C(O)—N(R$^X$)$_2$, when used terminally, and —C(O)—N(R$^X$)— or —N(R$^X$)—C(O)— when used internally, wherein R$^X$ and R$^Y$ are defined below. Examples of amido groups include alkylamido (such as alkylcarbonylamino or alkyl aminocarbonyl), (heterocycloaliphatic)amido, (heteroaralkyl)amido, (heteroaryl)amido, (heterocycloalkyl)alkylamido, arylamido, aralkylamido, (cycloalkyl)alkylamido, or cycloalkylamido.

As used herein, an "amino" group refers to —NR$^X$R$^Y$ wherein each of R$^X$ and R$^Y$ is independently hydrogen, alkyl, cycloakyl, (cycloalkyl)alkyl, aryl, aralkyl, heterocycloalkyl, (heterocycloalkyl)alkyl, heteroaryl, carboxy, sulfanyl, sulfinyl, sulfonyl, (alkyl)carbonyl, (cycloalkyl)carbonyl, ((cycloalkyl)alkyl)carbonyl, arylcarbonyl, (aralkyl)carbonyl, (heterocycloalkyl)carbonyl, ((heterocycloalkyl)alkyl)carbonyl, (heteroaryl)carbonyl, or (heteroaralkyl)carbonyl, each of which being defined herein and being optionally substituted. Examples of amino groups include alkylamino, dialkylamino, or arylamino. When the term "amino" is not the terminal group (e.g., alkylcarbonylamino), it is represented by —NR$^X$—. R$^X$ has the same meaning as defined above.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydroindenyl, decahydro-naphthyl, bicyclo[3.2.1]octyl, bicyclo[2.2.2] octyl, bicyclo[3.3.1]nonyl, bicyclo[3.3.2.]decyl, bicyclo[2.2.2]octyl, adamantyl, or ((aminocarbonyl)cycloalkyl)cycloalkyl.

As used herein, a "heterocycloalkyl" group refers to a 3-10 membered mono- or bicylic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothiochromenyl, octahydroindolyl, octahydropyrindinyl, decahydroquinolinyl, octahydrobenzo[b]thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo[3.3.1.0]nonyl. A monocyclic heterocycloalkyl group can be fused with a phenyl moiety to form structures, such as tetrahydroisoquinoline, which would be categorized as heteroaryls.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic. A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophenyl, quinolinyl, or isoquinolinyl). Some examples of heteroaryl are azetidinyl, pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b]thiophenyl, indazolyl, benzimidazolyl, benzthiazolyl, puryl, cinnolyl, quinolyl, quinazolyl, cinnolyl, phthalazyl, quinazolyl, quinoxalyl, isoquinolyl, 4H-quinolizyl, benzo-1,2,5-thiadiazolyl, or 1,8-naphthyridyl.

Without limitation, monocyclic heteroaryls include furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizinyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

Base Oil

The emulsifier of the present disclosure may be blended with a majority of base oil. Base oils suitable for use in formulating engine lubricant compositions and/or the metal working compositions (or other lubricating composition) may be selected from any of suitable synthetic oils, animal oils, vegetable oils, mineral oils or mixtures thereof. Animal oils and vegetable oils (e.g., lard oil, castor oil) as well as mineral lubricating oils such as liquid petroleum oils and solvent treated or acid-treated mineral lubricating oils of the paraffinic, naphthenic or mixed paraffinic-naphthenic types may be used. Oils derived from coal or shale may also be suitable. The base oil typically may have a viscosity of about 2 to about 15 cSt or, as a further example, about 2 to about 10 cSt at 100° C. Further, an oil derived from a gas-to-liquid process is also suitable.

Suitable synthetic base oils may include alkyl esters of dicarboxylic acids, polyglycols and alcohols, poly-alpha-olefins, including polybutenes, alkyl benzenes, organic esters of phosphoric acids, and polysilicone oils. Synthetic oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, di-nonylbenzenes, di-(2-ethylhexyl)benzenes, etc.); polyphenyls (e.g., biphenyls, terphenyl, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that may be used. Such oils are exemplified by the oils prepared through polymerization of ethylene oxide or propylene oxide, the alkyl and aryl ethers of these polyoxyalkylene polymers (e.g., methyl-polyisopropylene glycol ether having an average molecular weight of about 1000, diphenyl ether of polyethylene glycol having a molecular weight of about 500-1000, diethyl ether of polypropylene glycol having a molecular weight of about 1000-1500, etc.) or mono- and polycarboxylic esters thereof, for example, the acetic acid esters, mixed $C_3$-$C_8$ fatty acid esters, or the $C_{13}$ oxo-acid diester of tetraethylene glycol.

Another class of synthetic oils that may be used includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Hence, the base oil used which may be used to make the engine and/or metalworking lubricant compositions as described herein may be selected from any of the base oils in Groups I-V as specified in the American Petroleum Institute (API) Base Oil Interchangeability Guidelines. Such base oil groups are as follows:

TABLE 1

| Base Oil Group[1] | Sulfur (wt %) | | Saturates (wt. %) | Viscosity Index |
|---|---|---|---|---|
| Group I | >0.03 | And/or | <90 | 80 to 120 |
| Group II | ≤0.03 | And | ≥90 | 80 to 120 |
| Group III | ≤0.03 | And | ≥90 | ≥120 |
| Group IV | | all polyalphaolefins (PAOs) | | |
| Group V | | all others not included in Groups I-IV | | |

[1]Groups I-III are mineral oil base stocks.

The base oil may contain a minor or major amount of a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. PAOs may have a viscosity of from about 2 to about 15, or from about 3 to about 12, or from about 4 to about 8 cSt at 100° C. Examples of PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

The base oil may be an oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. For example, the hydrocarbons may be hydroisomerized using processes disclosed in U.S. Pat. Nos. 6,103,099 or 6,180,575; hydrocracked and hydroisomerized using processes disclosed in U.S. Pat. Nos. 4,943,672 or 6,096,940; dewaxed using processes disclosed in U.S. Pat. No. 5,882,505; or hydroisomerized and dewaxed using processes disclosed in U.S. Pat. Nos. 6,013,171; 6,080,301; or 6,165,949.

Unrefined, refined, and rerefined oils, either natural or synthetic (as well as mixtures of two or more of any of these) of the type disclosed hereinabove can be used in the base oils. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives, contaminants, and oil breakdown products.

The base oil may be combined with the emulsifying agent described herein along with optional additives to provide an engine lubricant composition. Accordingly, the base oil may be present in the engine lubricant composition in a major amount ranging from about 50 wt. % to about 95 wt. % based on a total weight of the lubricant composition.

Other optional additives of the lubricating oils are described below.

Metal-Containing Detergents

Metal detergents that may be used with the dispersant reaction product described above generally comprise a polar head with a long hydrophobic tail where the polar head comprises a metal salt of an acidic organic compound. The salts may contain a substantially stoichiometric amount of the metal, in which case they are usually described as normal or neutral salts, and would typically have a total base number or TBN (as measured by ASTM D2896) of from about 0 to less than about 150. Large amounts of a metal base may be included by reacting an excess of a metal compound such as an oxide or hydroxide with an acidic gas such as carbon dioxide. The resulting overbased detergent comprises micelles of neutralized detergent surrounding a core of inorganic metal base (e.g., hydrated carbonates). Such overbased detergents may have a TBN of about 150 or greater, such as from about 150 to about 450 or more.

Detergents that may be suitable for use in the present embodiments include oil-soluble overbased, low base, and neutral sulfonates, phenates, sulfurized phenates, and salicylates of a metal, particularly the alkali or alkaline earth metals, e.g., sodium, potassium, lithium, calcium, and magnesium. More than one metal may be present, for example, both calcium and magnesium. Mixtures of calcium and/or magnesium with sodium may also be suitable. Suitable metal detergents may be overbased calcium or magnesium sulfonates having a TBN of from 150 to 450 TBN, overbased calcium or magnesium phenates or sulfurized phenates having a TBN of from 150 to 300 TBN, and overbased calcium or magnesium salicylates having a TBN of from 130 to 350. Mixtures of such salts may also be used.

The metal-containing detergent may be present in a lubricating composition in an amount of from about 0.5 wt % to about 5 wt %. As a further example, the metal-containing detergent may be present in an amount of from about 1.0 wt % to about 3.0 wt %. The metal-containing detergent may be present in a lubricating composition in an amount sufficient to provide from about 500 to about 5000 ppm alkali and/or alkaline earth metal to the lubricant composition based on a total weight of the lubricant composition. As a further example, the metal-containing detergent may be present in a lubricating composition in an amount sufficient to provide from about 1000 to about 3000 ppm alkali and/or alkaline earth metal.

Phosphorus-Based Anti-Wear Agents

Phosphorus-based wear preventative agents may be used and may comprise a metal dihydrocarbyl dithiophosphate compound, such as but not limited to a zinc dihydrocarbyl dithiophosphate compound. Suitable metal dihydrocarbyl dithiophosphates may comprise dihydrocarbyl dithiophosphate metal salts wherein the metal may be an alkali or alkaline earth metal, or aluminum, lead, tin, molybdenum, manganese, nickel, copper, or zinc.

Dihydrocarbyl dithiophosphate metal salts may be prepared in accordance with known techniques by first forming a dihydrocarbyl dithiophosphoric acid (DDPA), usually by reaction of one or more alcohol or a phenol with $P_2S_5$ and then neutralizing the formed DDPA with a metal compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the metal salt, any basic or neutral metal compound could be used but the oxides, hydroxides and carbonates are most generally employed. Commercial additives frequently contain an excess of metal due to the use of an excess of the basic metal compound in the neutralization reaction.

The zinc dihydrocarbyl dithiophosphates (ZDDP) are oil soluble salts of dihydrocarbyl dithiophosphoric acids and may be represented by the following formula:

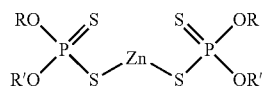

wherein R and R' may be the same or different hydrocarbyl radicals containing from 1 to 18, for example 2 to 12, carbon atoms and including radicals such as alkyl, alkenyl, aryl, arylalkyl, alkaryl, and cycloaliphatic radicals. R and R' groups may be alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e., R and R') in the dithiophosphoric acid will generally be about 5 or greater. The zinc dihydrocarbyl dithiophosphate can therefore comprise zinc dialkyl dithiophosphates.

Other suitable components that may be utilized as the phosphorus-based wear preventative include any suitable organophosphorus compound, such as but not limited to, phosphates, thiophosphates, di-thiophosphates, phosphites, and salts thereof and phosphonates. Suitable examples are tricresyl phosphate (TCP), di-alkyl phosphite (e.g., dibutyl hydrogen phosphite), and amyl acid phosphate.

Another suitable component is a phosphorylated succinimide such as a completed reaction product from a reaction between a hydrocarbyl substituted succinic acylating agent and a polyamine combined with a phosphorus source, such as inorganic or organic phosphorus acid or ester. Further, it may comprise compounds wherein the product may have amide, amidine, and/or salt linkages in addition to the imide linkage of the type that results from the reaction of a primary amino group and an anhydride moiety.

The phosphorus-based wear preventative may be present in a lubricating composition in an amount sufficient to provide from about 200 to about 2000 ppm phosphorus. As a further example, the phosphorus-based wear preventative may be present in a lubricating composition in an amount sufficient to provide from about 500 to about 800 ppm phosphorus.

The phosphorus-based wear preventative may be present in a lubricating composition in an amount sufficient to provide a ratio of alkali and/or alkaline earth metal content (ppm) based on the total amount of alkali and/or alkaline earth metal in the lubricating composition to phosphorus content (ppm) based on the total amount of phosphorus in the lubricating composition of from about 1.6 to about 3.0 (ppm/ppm).

Friction Modifiers

Embodiments of the present disclosure may include one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, and the like.

Suitable friction modifiers may contain hydrocarbyl groups that are selected from straight chain, branched chain, or aromatic hydrocarbyl groups or admixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms and may be saturated or unsaturated.

Aminic friction modifiers may include amides of polyamines. Such compounds can have hydrocarbyl groups that are linear, either saturated or unsaturated, or a mixture thereof and may contain from about 12 to about 25 carbon atoms.

Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference.

Other suitable friction modifiers may include an organic, ashless (metal-free), nitrogen-free organic friction modifier. Such friction modifiers may include esters formed by reacting carboxylic acids and anhydrides with alkanols. Other useful friction modifiers generally include a polar terminal group (e.g. carboxyl or hydroxyl) covalently bonded to an oleophilic hydrocarbon chain. Esters of carboxylic acids and anhydrides with alkanols are described in U.S. Pat. No. 4,702,850. Another example of an organic ashless nitrogen-free friction modifier is known generally as glycerol monooleate (GMO) which may contain mono- and diesters of oleic acid. Other suitable friction modifiers are described in U.S. Pat. No. 6,723,685, herein incorporated by reference. The ashless friction modifier may be present in the lubricant composition in an amount ranging from about 0.1 to about 0.4 percent by weight based on a total weight of the lubricant composition.

Suitable friction modifiers may also include one or more molybdenum compounds. The molybdenum compound may be selected from the group consisting of molybdenum dithiocarbamates (MoDTC), molybdenum dithiophosphates, molybdenum dithiophosphinates, molybdenum xanthates, molybdenum thioxanthates, molybdenum sulfides, a trinuclear organo-molybdenum compound, molybdenum/amine complexes, and mixtures thereof.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897.

Suitable molybdenum dithiocarbamates may be represented by the formula:

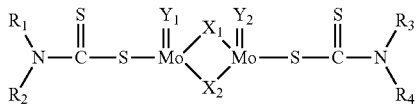

where $R_1$, $R_2$, $R_3$, and $R_4$ each independently represent a hydrogen atom, a $C_1$ to $C_{20}$ alkyl group, a $C_6$ to $C_{20}$ cycloalkyl, aryl, alkylaryl, or aralkyl group, or a $C_3$ to $C_{20}$ hydrocarbyl group containing an ester, ether, alcohol, or carboxyl group; and $X_1$, $X_2$, $Y_1$, and $Y_2$ each independently represent a sulfur or oxygen atom.

Examples of suitable groups for each of $R_1$, $R_2$, $R_3$, and $R_4$ include 2-ethylhexyl, nonylphenyl, methyl, ethyl, n-propyl, iso-propyl, n-butyl, t-butyl, n-hexyl, n-octyl, nonyl, decyl, dodecyl, tridecyl, lauryl, oleyl, linoleyl, cyclohexyl and phenylmethyl. $R_1$ to $R_4$ may each have $C_6$ to $C_{18}$ alkyl groups. $X_1$ and $X_2$ may be the same, and $Y_1$ and $Y_2$ may be the same. $X_1$ and $X_2$ may both comprise sulfur atoms, and $Y_1$ and $Y_2$ may both comprise oxygen atoms.

Further examples of molybdenum dithiocarbamates include $C_6$-$C_{18}$ dialkyl or diaryldithiocarbamates, or alkylaryldithiocarbamates such as dibutyl-, diamyl-di-(2-ethylhexyl)-, dilauryl-, dioleyl-, and dicyclohexyl-dithiocarbamate.

Another class of suitable organo-molybdenum compounds are trinuclear molybdenum compounds, such as those of the formula $Mo_3S_kL_nQ_z$ and mixtures thereof, wherein L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference.

The molybdenum compound may be present in a fully formulated engine lubricant in an amount to provide about 5 ppm to 500 ppm by weight molybdenum. As a further example, the molybdenum compound may be present in an amount to provide about 50 to 300 ppm by weight molybdenum. A particularly suitable amount of molybdenum compound may be an amount sufficient to provide from about 60 to about 250 ppm by weight molybdenum to the lubricant composition.

Anti-Foam Agents

In some embodiments, a foam inhibitor may form another component suitable for use in the compositions. Foam inhibitors may be selected from silicones, polyacrylates, and the like. The amount of antifoam agent in the engine lubricant formulations described herein may range from about 0.001 wt % to about 0.1 wt % based on the total weight of the formulation. As a further example, antifoam agent may be present in an amount from about 0.004 wt. % to about 0.008 wt. %.

Oxidation Inhibitor Components

Oxidation inhibitors or antioxidants reduce the tendency of base stocks to deteriorate in service which deterioration can be evidenced by the products of oxidation such as sludge and varnish-like deposits that deposit on metal surfaces and by viscosity growth of the finished lubricant. Such oxidation inhibitors include hindered phenols, sulfurized hindered phenols, alkaline earth metal salts of alkylphenolthioesters having $C_5$ to $C_{12}$ alkyl side chains, sulfurized alkylphenols, metal salts of either sulfurized or nonsulfurized alkylphenols, for example calcium nonylphenol sulfide, ashless oil soluble phenates and sulfurized phenates, phosphosulfurized or sulfurized hydrocarbons, phosphorus esters, metal thiocarbamates, and oil soluble copper compounds as described in U.S. Pat. No. 4,867,890.

Other antioxidants that may be used include sterically hindered phenols and esters thereof, diarylamines, alkylated phenothiazines, sulfurized compounds, and ashless dialkyldithiocarbamates. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2-methylenebis(4-methyl-6 tert-butylphenol, 4,4-methylene-bis(2,6-di-tert-butylphenol) and mixtures thereof as described in U.S Publication No. 2004/0266630.

Diarylamine antioxidants include, but are not limited to diarylamines having the formula:

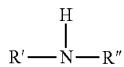

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenyl-amine; dibutyldiphenylamine; monooctyldiphenylamine; dioctyldiphenylamine; mononoyldiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyl-diphenylamine; p-oriented styrenated diphenylamine; mixed butyloctyldi-phenylamine; and mixed octylstyryldiphenylamine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soybean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 wt. % sulfur, when added to the finished lubricant at a 1.0 wt. % treat level, will deliver 2000 ppm of sulfur to the finished lubricant. A sulfurized fatty oil or olefin containing 10 wt. % sulfur, when added to the finished lubricant at a 1.0 wt. % treat level, will deliver 1000 ppm sulfur to the finished lubricant. It is desirable that the sulfurized olefin or sulfurized fatty oil to deliver between 200 ppm and 2000 ppm sulfur to the finished lubricant.

A suitable engine lubricant may include additive components in the ranges listed in Table 2 with broad and narrower ranges. Base oil is the balance of the lubricant

TABLE 2

| Component | Wt. % | Wt. % |
|---|---|---|
| Emulsifying Agents | 0.01-1 | 0.02-0.2 |
| Additional Dispersants | 0-10 | 1-6 |
| Antioxidants | 0-5 | 0.01-3 |
| Metal Detergents | 0-15 | 0.1-8 |
| Corrosion Inhibitor | 0-5 | 0-2 |
| Metal dihydrocarbyl dithiophosphate | 0-6 | 0.1-4 |
| Ash-free amine phosphate salt | 0-6 | 0.0-4 |
| Antifoaming agents | 0-5 | 0.001-0.15 |

TABLE 2-continued

| Component | Wt. % | Wt. % |
| --- | --- | --- |
| Antiwear agents | 0-1 | 0-0.8 |
| Pour point depressant | 0-5 | 0.01-1.5 |
| Viscosity modifier | 0-20 | 0.25-10 |
| Friction modifiers | 0-2 | 0.1-1 |

Additional optional additives that may be included in lubricant compositions described herein include, but are not limited to, rust inhibitors, emulsifiers, demulsifiers, and oil-soluble titanium-containing additives.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). The use of an additive concentrate may take advantage of the mutual compatibility afforded by the combination of ingredients when in the form of an additive concentrate. Also, the use of a concentrate may reduce blending time and may lessen the possibility of blending errors.

The present disclosure provides novel lubricating oil blends specifically formulated for use as automotive engine lubricants. Embodiments of the present disclosure may provide lubricating oils suitable for engine applications that provide improvements in one or more of the following characteristics: antioxidancy, antiwear performance, rust inhibition, fuel economy, water tolerance, air entrainment, seal protection, and foam reducing properties.

The emulsifying agents herein may also be used in metal working fluid. In such approach, the emulsifying agent may be used in amounts from about 0.01 to about 1.0 weight percent.

A variety of other additives may also be present within the metalworking fluid. Non-limiting examples include: coupling agents, antiwear additives, extreme pressure additives such as phosphorous compounds such as phosphate esters and sulfur compounds such as polysulfides, antioxidants, pH buffers, oil (e.g., naphthenic or paraffinic oils), water (e.g., tap water, distilled water, deionized water, treated water, etc.), biocides (e.g., bacteriocides or fungicides) including both formaldehyde releasing and formaldehyde free biocides, foam inhibitors, rust inhibitors, lubricating agents such as ricinoleic acid or self-polymerized versions thereof, corrosion inhibitors, polymers, or the like. Many of these are commercially available.

Non-limiting examples of corrosion inhibitors include alkali and alkanolamine salts of carboxylic acids, undecandioic/dodecandioic acid and its salts, $C_{4-22}$ carboxylic acids and their salts, boric acids, compounds and their salts, tolytriazole and its salts, benzotriazoles and its salts, imidazolines and its salts, alkanolamines and amides, sulfonates, alkali and alkanolamine salts of naphthenic acids, phosphate ester amine salts, alkali nitrites, alkali carbonates, carboxylic acid derivatives, alkylsulfonamide carboxylic acids, arylsulfonamide carboxylic acids, fatty sarkosides, phenoxy derivatives and sodium molybdate. Other non-limiting examples include: tertiary polyamines such as pentamethyl dipropyl-triamine and salts thereof, such as alkyl polyalkylene glycol ether phosphate salts, as taught in EP2930229 (A1). Other examples includes products to passivate or prevent staining of metals such as aluminum, copper and other yellow metals such as brass. Many of these are commercially available.

General Synthesis

The emulsifier agents of the present disclosure and described above can be produced by the general synthetic strategy or reaction described in Scheme 1 below, wherein the variables R, $R^b$, A, X, Y, and m are described herein. From the scheme, it is shown that a substituted succinic acid or anhydride can be reacted with a polyalkylene glycol in the presence of a catalyst to produce the polymeric emulsifying agents of Formula I. In one approach, no other reactants are included in the reaction mixture. The reaction can be performed in the presence of a solvent and can also be performed under neat conditions. The reaction can also be performed in the presence of a catalyst. In some embodiments, the catalyst is an acid catalyst. In some embodiments, the catalyst is an organic acid. In a further embodiment, the acid catalyst is a sulfonic acid catalyst. In a specific embodiment, the catalyst is p-toluenesulfonic acid (PTSA). In still some other embodiments, the catalyst is a lewis acid catalyst, such as a transition metal complex. In some embodiments, the transition metal is aluminum or titanium.

In some embodiments, the reaction is performed by adding the reactants to a reaction vessel in a molar ratio within the range of about 0.1-1.0 to about 1.0-0.1 of anhydride or dicarboxylic acid to polyalkylene glycol. In one embodiment, the reaction is performed by adding the reactants to a reaction vessel in a 1:1 molar ratio of anhydride or dicarboxylic acid to polyalkylene glycol. In another embodiment, the reaction is performed by adding the reactants to a reaction vessel in a near 1:1 molar ratio with a slight molar excess of anhydride or dicarboxylic acid to polyalkylene glycol. In one embodiment, the slight excess is less than a 10% molar excess. In one embodiment, the slight excess is less than a 5% molar excess. In one embodiment, the slight excess is less than a 1% molar excess. In one embodiment, the slight excess is less than a 0.1% molar excess. In one embodiment the slight excess is less than a 0.01% molar excess. In one embodiment, the slight excess is less than a 0.001% molar excess. In one embodiment, the slight excess is less than a 0.0001% molar excess. In one embodiment, the slight excess is less than a 0.00001% molar excess.

Scheme 1: General synthesis of emulsifier compounds of Formula I

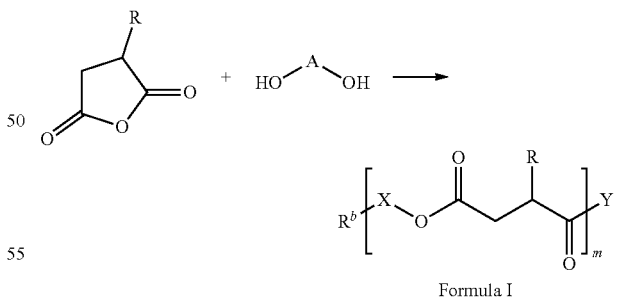

Formula I

Materials and Methods

The reactions described herein were performed in a 500 mL flask with overhead stirring, a water removal condenser, temperature probe, and nitrogen supply. When necessary, the reactions were heated using an isomantle.

Polyisobutylene succinic anhydride (PIBSA) compounds were supplied by Vertellus; Polyethylene glycols (PEG) were supplied by BASF; and p-toluenesulfonic acid (PTSA) was supplied by VWR International.

EXAMPLES

In order that the emulsifier described therein may be more fully understood, the following examples are set forth. It should be understood that these general and specific examples are for illustrative purposes only and are not to be construed as limiting this disclosure in any manner. Unless otherwise noted, all ratios and percentages are by weight.

Example 1

This Example provides a method of preparing a polyisobutylene (PIB) succinic anhydride (SA) with a number average molecular weight of the PIB group of 1000 g/mol reacted with polyethylene glycol (PEG) having a number average molecular weight of 200 g/mol to form a PIBSA (1000)-PEG(200) emulsification agent, wherein Z is H or a PIBSA residue, using the following reaction scheme with p-Toluenesulfonic acid (PTSA) catalyst:

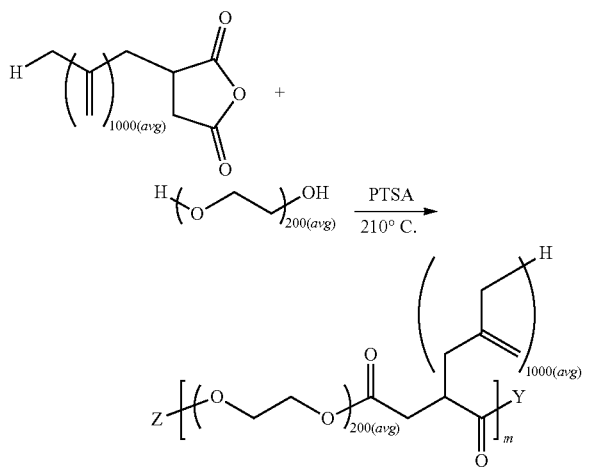

PIBSA-1000 (about 510 g) and PEG-200 (about 100 g) (1:1 molar ratio, with a very slight PIBSA excess) were stirred at about 20° C. p-Toluenesulfonic acid (PTSA) catalyst (about 6 g) was then added and the mixture was heated to about 210° C. with stirring under nitrogen until the acid value was under about 5 mg KOH (about 15 hours). The resulting product was a highly viscous, clear amber liquid at room temperature of about 20° C.

Example 2

The product from Example 1 was tested using ASTM D7563-10 (E-85 Emulsion Test). An Engine oil/Emulsifier blend was prepared by mixing gasoline engine oil suitable for a standard passenger car (about 185 mL) with the emulsifier from Example 1 at concentrations of about 0.025, 0.05, and 0.2 weight percent. This experiment also included a 0% control with no emulsification agent.

The Engine oil/emulsifier blend (about 185 mL) was then mixed with water (about 18.5 mL), and E-85 fuel (a blend of ethanol 85% and unleaded gasoline 15%; about 18.5 mL) on a high speed mixer at about 10,000 rpm for about 60 seconds. About 100 mL of each mixture was placed into a measuring cylinder, which was then stored at about 22° C. for about 24 hours. The resulting mixture was then inspected for phase separation. The test oil mixture passes the ASTM D7563-10 test when there is a complete absence of any aqueous layer after 24 hours.

The results showed that only the 0% control was found to have an aqueous layer (~15 mL), and all of the samples containing the emulsifier agent of Example 1 (0.025%-0.2%) passed this test and was free of any separated aqueous layer. Thus, the emulsifier of the present disclosure achieves stable emulsions with much lower treat rates, in some instances, half or less of the conventional treat rates of prior emulsifiers.

It is to be understood that while the disclosure has been described in conjunction with the detailed description thereof, the foregoing description is intended to illustrate and not limit the scope of the disclosure, which is defined by the scope of the appended claims. Other aspects, advantages, and modifications are within the scope of the claims.

What is claimed is:

1. A lubricating oil composition comprising
   a major amount of a base oil;
   about 0.001 to about 0.15 weight percent of an emulsifying agent including a compound of Formula I

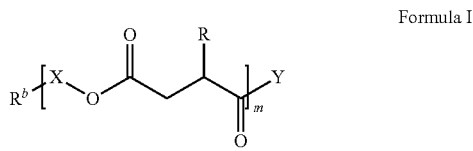

Formula I wherein
   each X is independently a polyalkylene oxide group of the formula —[OA]$_p$-;
   Y is a hydroxyl group or a polyalkylene oxide group of the formula —[OA]$_p$-OH;
   each A is independently an alkylene selected from the group consisting of ethylene, propylene, and butylene, and mixtures thereof;
   R$^b$ is H or a chemical moiety having the structure

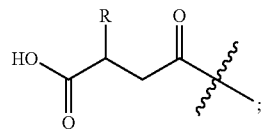

R is a linear or branched aliphatic group having a number average molecular weight of about 750 to about 2500; and
   p is an integer to independently provide each X and/or each Y with a number average molecular weight of about 150 to about 250; and
   m is an integer to provide a weight average molecular weight of the compound of Formula I from about 7,000 to about 50,000.

2. The lubricating oil composition of claim 1, wherein p is an integer which provides a polyalkylene oxide group with a number average molecular weight from about 150 to about 200.

3. The lubricating oil composition of claim 1, wherein the compound of Formula I has a weight average molecular weight of about 10,000 to about 15,000.

4. The lubricating oil composition of claim 1, wherein R has a number average molecular weight of about 950 to about 2300.

5. The lubricating oil composition of claim 1, wherein the lubricating oil composition includes about 0.001 to about 0.1 weight percent of the compound of Formula I.

6. The lubricating oil composition of claim 1, wherein the emulsifying agent of Formula I is produced from a catalyzed reaction consisting essentially of a polyalkylene glycol reacted with a dicarboxylic acid or anhydride of a dicarboxylic acid.

7. The lubricating oil composition of claim 6, wherein the catalyzed reaction includes a polyisobutylene succinic anhydride and wherein the polyisobutylene group thereof has a number average molecular weight of about 750 to about 2500.

8. The lubricating oil composition of claim 6, wherein the molar ratio of the polyalkylene glycol to the dicarboxylic acid or dicarboxylic anhydride in the catalyzed reaction is about 0.1:1.0 to about 1.0:0.1.

9. The lubricating oil composition of claim 1, wherein the lubricating oil composition is substantially free of an aqueous layer after about 24 hours when tested according to ASTM D7563-10.

10. The lubricating oil composition of claim 1, wherein the number average molecular weight of the linear or branched R group is about 1.5 to about 15 times higher than the number average molecular weight of the polyalkylene oxide group.

* * * * *